United States Patent
King et al.

(10) Patent No.: US 8,029,011 B2
(45) Date of Patent: Oct. 4, 2011

(54) ADJUSTABLE HANDLEBAR ASSEMBLY FOR A SADDLE-TYPE VEHICLE

(75) Inventors: Darin D. King, Raymond, OH (US); Robert S. Zimmerman, North Lewisburg, OH (US); Daniel T. Sellars, West Liberty, OH (US); Scott D. Batdorf, Raymond, OH (US)

(73) Assignee: Honda Motor Company, Ltd., Tokyo (JP)

( * ) Notice: Subject to any disclaimer, the term of this patent is extended or adjusted under 35 U.S.C. 154(b) by 0 days.

(21) Appl. No.: 12/612,808

(22) Filed: Nov. 5, 2009

(65) Prior Publication Data

US 2011/0100741 A1    May 5, 2011

(51) Int. Cl.
*B62K 21/16* (2006.01)

(52) U.S. Cl. ............... 280/279; 280/280; 280/288.4; 74/551.1; 74/551.2; 74/551.3; 74/551.4; 74/551.5; 74/551.6; 74/551.7; 74/551.8

(58) Field of Classification Search .......... 280/279, 280/280, 288.4; 74/551.1, 551.2, 551.3, 74/551.4, 551.5, 551.6, 551.7, 551.8
See application file for complete search history.

(56) References Cited

U.S. PATENT DOCUMENTS

| | | | |
|---|---|---|---|
| 1,164,122 A | 12/1915 | St. Yves | |
| 1,756,339 A | 4/1930 | Broberg | |
| 3,505,901 A * | 4/1970 | Stone | 74/551.4 |
| 4,023,436 A * | 5/1977 | Dodge | 74/551.3 |
| 4,361,057 A * | 11/1982 | Kochera | 74/551.4 |
| 4,384,497 A * | 5/1983 | Gatsos | 74/551.4 |
| 4,420,989 A | 12/1983 | Finkle | |
| 4,540,189 A | 9/1985 | Tanaka | |
| 4,624,470 A | 11/1986 | Love | |
| 4,682,509 A | 7/1987 | Takamiya et al. | |
| 4,729,255 A * | 3/1988 | Moulton | 74/551.3 |
| 5,078,391 A | 1/1992 | Moore, Sr. | |
| 5,458,213 A | 10/1995 | Nakaya et al. | |
| 5,685,201 A * | 11/1997 | Renshaw | 74/551.2 |

(Continued)

FOREIGN PATENT DOCUMENTS

DE    4336485 A1    6/1994

(Continued)

OTHER PUBLICATIONS

U.S. Appl. No. 12/264,655, Titled: Handlebar Assemblies and Vehicles Including Same, Flied: Oct. 21, 2008, Inventors: Daisuke Nagao et al., it its entirety.

*Primary Examiner* — Paul N Dickson
*Assistant Examiner* — Marlon A Arce
(74) *Attorney, Agent, or Firm* — Ulmer & Berne LLP

(57) ABSTRACT

An adjustable handlebar assembly for a saddle-type vehicle includes a base member, a support member, a left handlebar and a right handlebar. The support member is rotatably coupled to the base member and each of the left handlebar and the right handlebar is attached to the support member. The support member is configured to permit the left handlebar and the right handlebar to be selectively moved relative to the support member and the base member, independently of one another, to selectively adjust each of the left handlebar and the right handlebar in respective, generally longitudinal directions along a saddle-type vehicle, when the adjustable handlebar assembly is pivotally coupled to a frame of the saddle-type vehicle.

22 Claims, 8 Drawing Sheets

U.S. PATENT DOCUMENTS

| | | |
|---|---|---|
| 5,727,427 A | 3/1998 | Nien |
| 6,234,042 B1 | 5/2001 | An |
| 6,467,787 B1 | 10/2002 | Marsh |
| 6,578,652 B1 | 6/2003 | Kobacker, II et al. |
| 6,860,500 B2 | 3/2005 | Hissam |
| 6,945,136 B2 * | 9/2005 | Nielsen ........................ 74/551.5 |
| 6,973,853 B2 | 12/2005 | Chang |
| 7,343,831 B1 * | 3/2008 | Tamcsin ........................ 74/551.1 |
| 7,685,904 B2 * | 3/2010 | Cutsforth ..................... 74/551.3 |
| 7,798,511 B2 * | 9/2010 | Takenaka et al. ............. 280/280 |
| 2003/0141121 A1 | 7/2003 | Flowers et al. |
| 2005/0109151 A1 | 5/2005 | Chiang et al. |
| 2005/0206120 A1 | 9/2005 | Liao |
| 2006/0162483 A1 | 7/2006 | Bowers |

FOREIGN PATENT DOCUMENTS

| | | |
|---|---|---|
| EP | 53667 A1 | 6/1982 |

* cited by examiner

ADJUSTABLE HANDLEBAR ASSEMBLY FOR A SADDLE-TYPE VEHICLE

TECHNICAL FIELD

The present invention relates generally to handlebar assemblies, and more particularly, to adjustable handlebar assemblies for saddle-type vehicles.

BACKGROUND

Handlebars of known saddle-type vehicles, such as motorcycles, include those that are made from steel or aluminum tubing that is bent to match a specific shape corresponding to a desired operator ride position and handling characteristics. Although known handlebars of this type have been successfully used, they can be subject to certain disadvantages. For instance, creating a prototype to match a new specification, with respect to desired operator ride position and handling characteristics, can be expensive and time-consuming.

Known handlebars also include those that have a single axis of adjustability. For example, mount members of the handlebar assembly can be adjusted to achieve a desired handlebar rake. However, adjustment of rake can also result in a change of sweep and rise of the handlebars, which can be undesirable.

SUMMARY

According to one embodiment, an adjustable handlebar assembly for a saddle-type vehicle includes a base member and a support member rotatably coupled to the base member. The adjustable handlebar assembly further includes a left handlebar attached to the support member and a right handlebar attached to the support member. The support member is configured to permit the left handlebar and the right handlebar to be selectively moved relative to the support member and the base member, independently of one another, to selectively adjust each of the left handlebar and the right handlebar in respective, generally longitudinal directions along a saddle-type vehicle, when the adjustable handlebar assembly is pivotally coupled to a frame of the saddle-type vehicle.

According to another embodiment, a saddle-type vehicle includes a frame and an adjustable handlebar assembly pivotally coupled to the frame. The adjustable handlebar assembly includes a base member and a support member rotatably coupled to the base member. The adjustable handlebar assembly further includes a left handlebar attached to the support member and a right handlebar attached to the support member. The support member is configured to permit the left handlebar and the right handlebar to be selectively moved relative to the support member and the base member, independently of one another, to selectively adjust each of the left handlebar and the right handlebar in respective, generally longitudinal directions along the saddle-type vehicle.

According to another embodiment, a motorcycle includes a frame, a seat supported by the frame, a front wheel, a rear wheel rotatably coupled to the frame, a fork, and an adjustable handlebar assembly. The fork rotatably supports the front wheel. The adjustable handlebar assembly includes a left handlebar and a right handlebar. The adjustable handlebar assembly is attached to the fork and is pivotally coupled to the frame. The adjustable handlebar assembly is operable for steering the front wheel. The adjustable handlebar assembly is adjustable to selectively adjust rake, rise, width, sweep, and longitudinal spacing forward of the seat, for each of the left handlebar and the right handlebar.

A method for designing an adjustable handlebar assembly for a saddle-type vehicle includes pivotally coupling an adjustable handlebar assembly to a frame of a saddle-type vehicle. The adjustable handlebar assembly includes a base member pivotally coupled to the frame, a support member rotatably coupled to the base member, a left handlebar attached to the support member and a right handlebar attached to the support member. The method further includes configuring the support member to permit the left handlebar and the right handlebar to be selectively moved relative to the support member and the base member, independently of one another, to selectively adjust each of the left handlebar and the right handlebar in respective, generally longitudinal directions along the saddle-type vehicle.

BRIEF DESCRIPTION OF THE DRAWINGS

Various embodiments will become better understood with regard to the following description, appended claims and accompanying drawings wherein:

DETAILED DESCRIPTION

Figure 1:
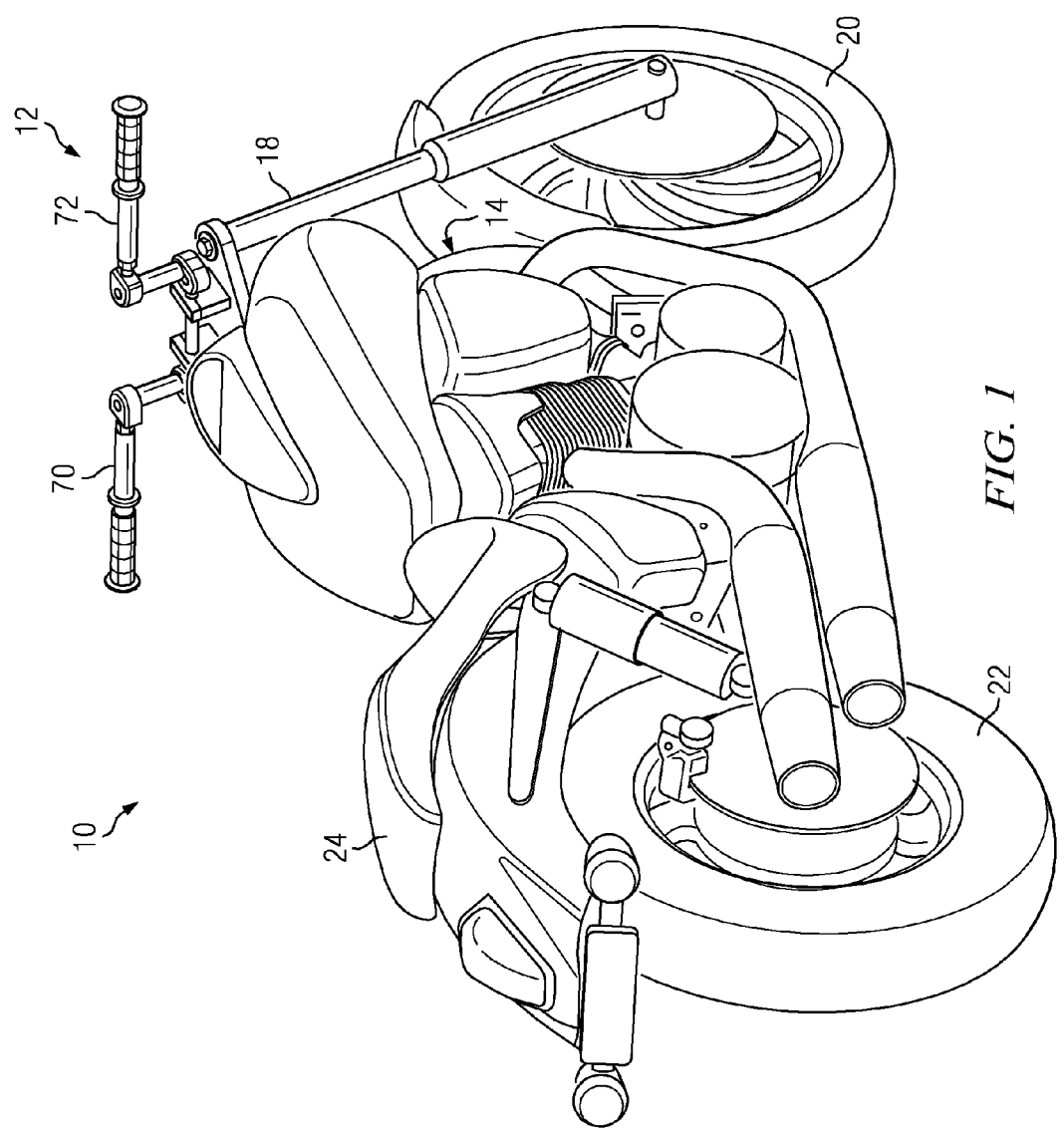
FIG. 1 is a perspective view of a saddle-type vehicle that includes an adjustable handlebar assembly according to one embodiment.

Referring to the drawings, wherein like numbers indicate the same or corresponding elements throughout the views, FIG. 1 illustrates a saddle-type vehicle 10 that can include an adjustable handlebar assembly 12 according to one embodiment. The saddle-type vehicle 10 is shown to be a motorcycle in FIG. 1. However, in alternative embodiments, a saddle-type vehicle that includes an adjustable handlebar assembly can be a personal watercraft, an all-terrain vehicle, a scooter, a snowmobile, or the like.

Figure 2:
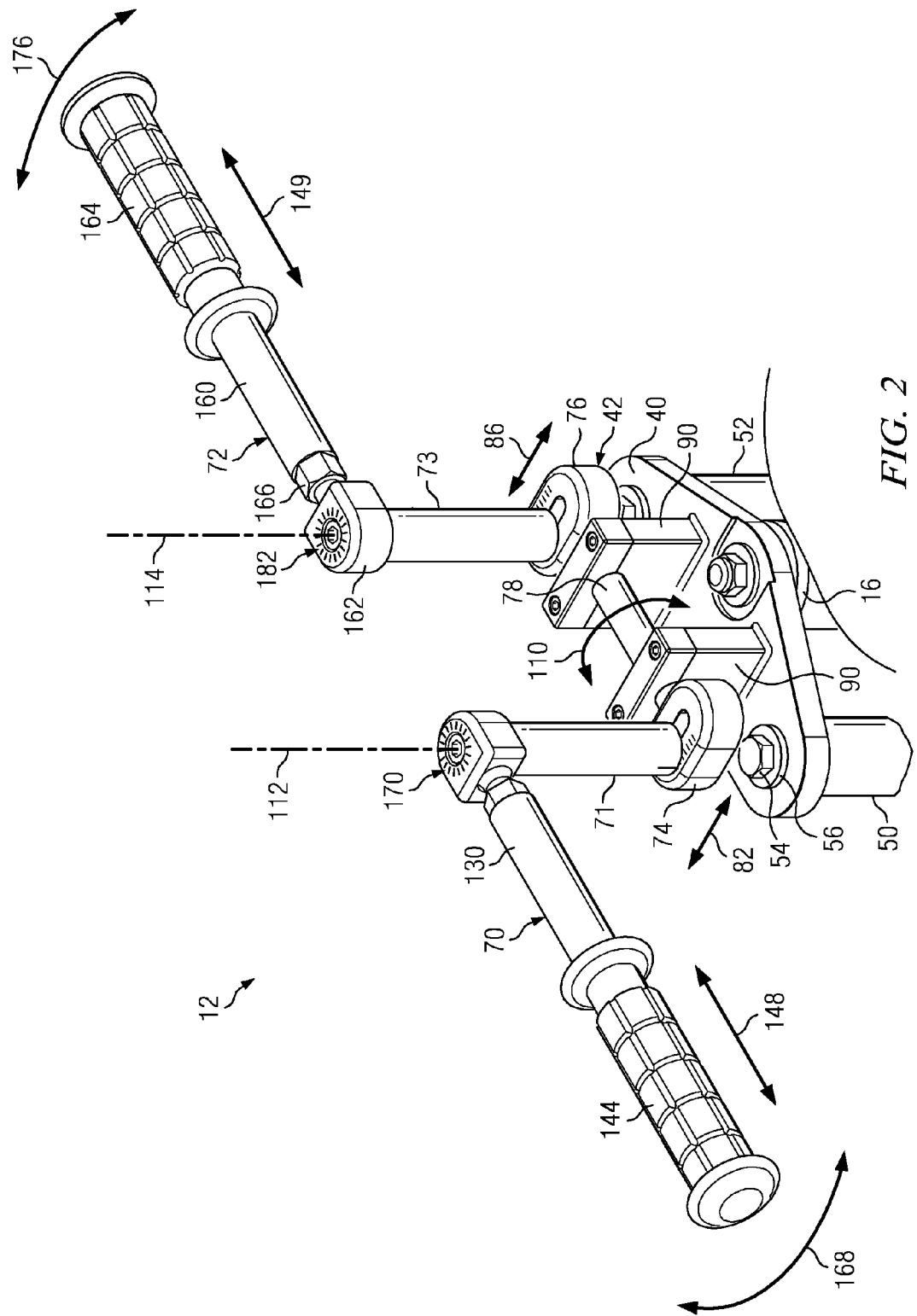
FIG. 2 is a perspective view of the adjustable handlebar assembly shown in FIG. 1.
Figure 3:
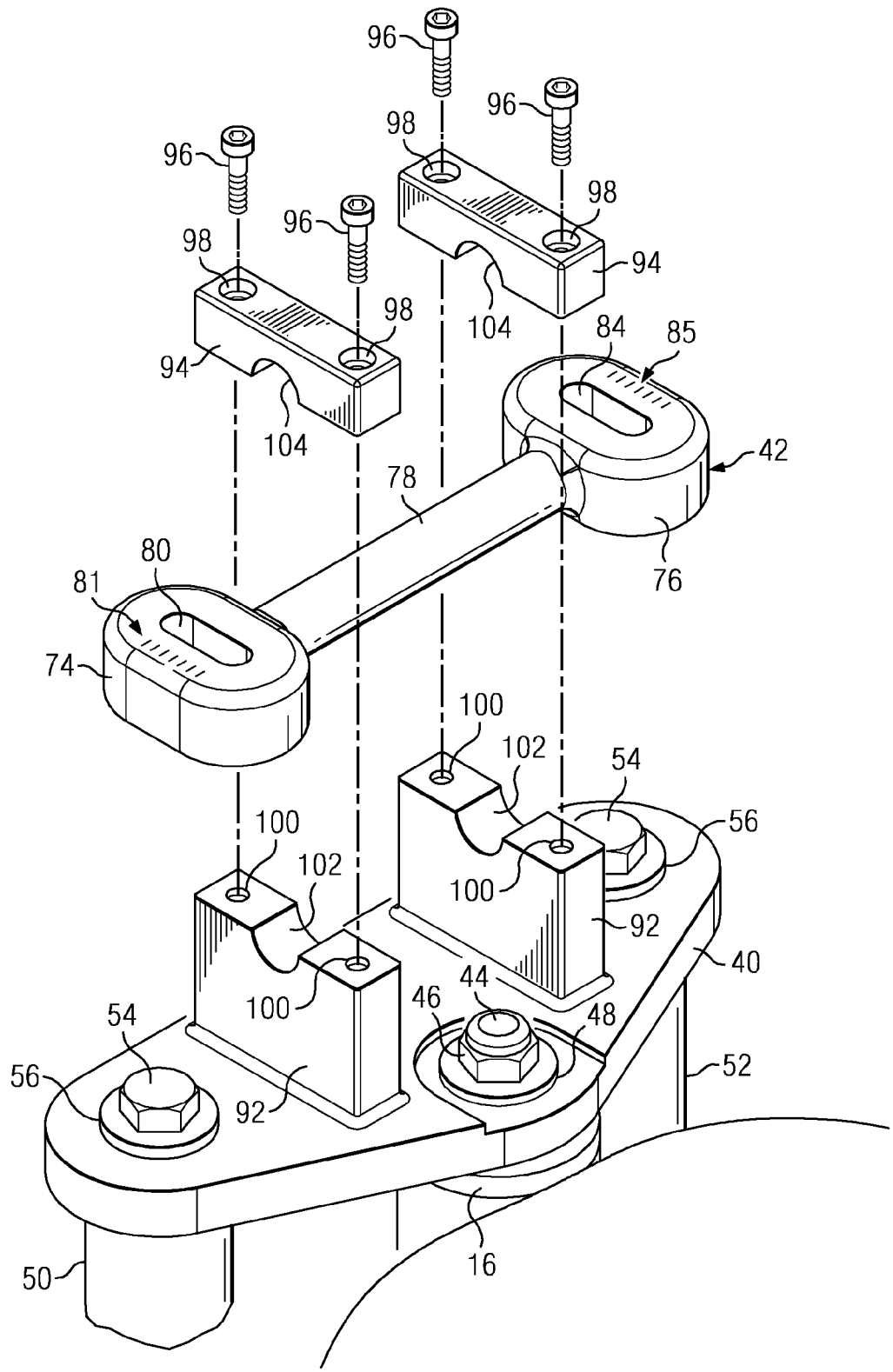
FIG. 3 is an exploded perspective view depicting certain components of the adjustable handlebar assembly shown in FIGS. 1 and 2.
Figure 4:
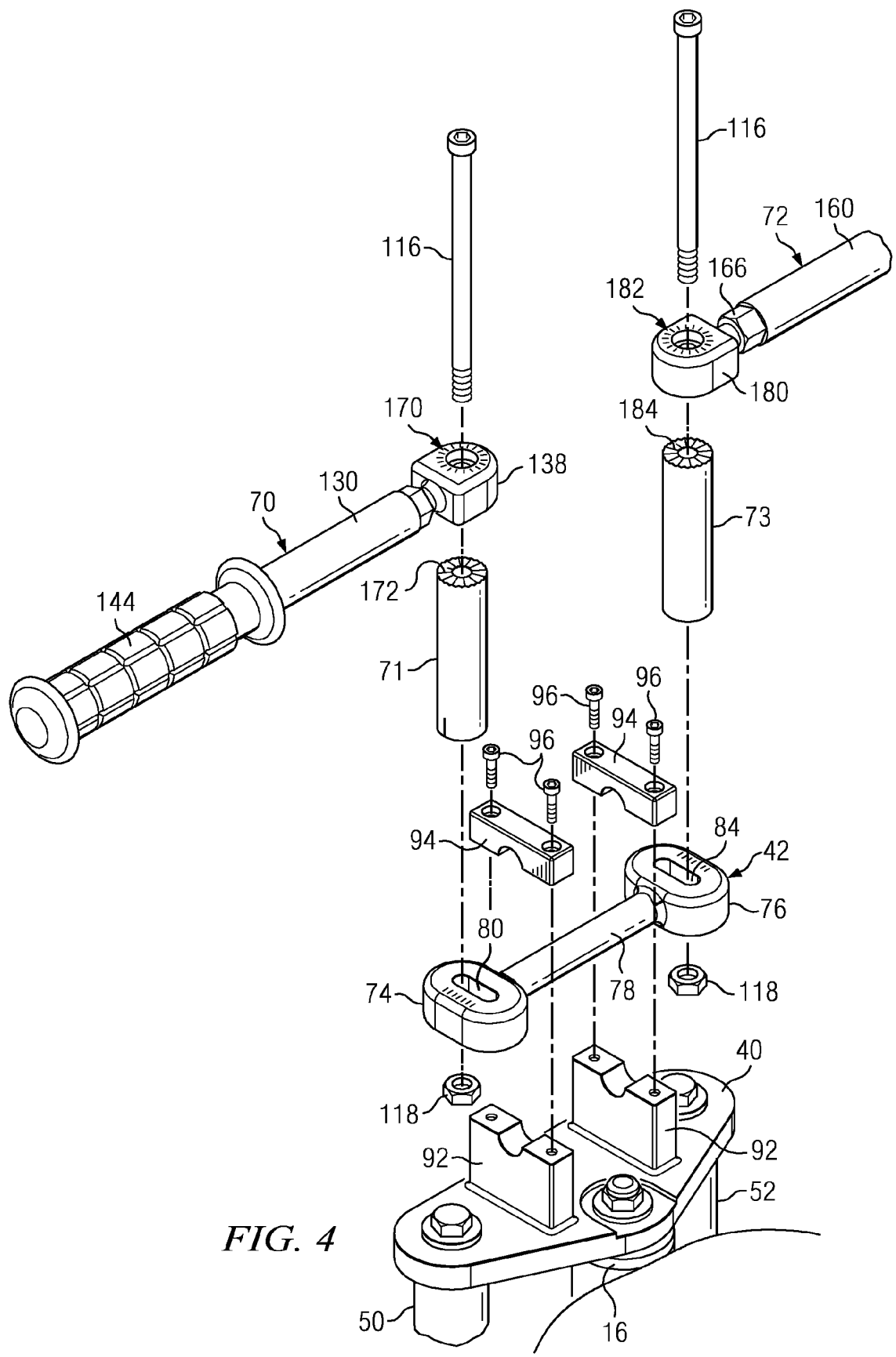
FIG. 4 is an exploded perspective view depicting the components of the adjustable handlebar assembly shown in FIG. 3, as well as additional components of the adjustable handlebar assembly.

The saddle-type vehicle 10 can include a frame, indicated generally at 14 in FIG. 1. The frame 14 can include a steering interface, e.g., a head tube 16 (FIGS. 2-4). The saddle-type vehicle 10 can further include a fork 18 that can be attached to the adjustable handlebar assembly 12, and can be pivotable about a steering axis (not shown) that extends through the head tube 16, under control of the adjustable handlebar assembly 12.

The saddle-type vehicle 10 can further include a front wheel 20 and a rear wheel 22. The fork 18 can rotatably support the front wheel 20 and the rear wheel 22 can be rotatably coupled to the frame 14. The saddle-type vehicle 10 can further include a seat 24 that can be supported by the frame 14. The seat 24 can be configured to support an operator of the saddle-type vehicle 10.

The adjustable handlebar assembly 12 can include a base member 40 and a support member 42 that can be rotatably coupled to the base member 40. The base member 40 can be pivotally coupled to the frame 14. In one embodiment, as shown in FIG. 3, the base member 40 can be pivotally coupled to the head tube 16 of frame 14, which can be achieved using fasteners, e.g., bolt 44, a plurality of nuts 46 (one shown) and a plurality of washers 48 (one shown). The base member 40 can be attached to the fork 18. The fork 18 can include a left upper member 50 and a right upper member 52, and the base member 40 can be attached to each of the upper members 50 and 52 using conventional fasteners, e.g., bolts 54, washers 56 and nuts (not shown).

The adjustable handlebar assembly 12 can further include a left handlebar 70 and a right handlebar 72. Each of the left handlebar 70 and the right handlebar 72 can be attached to the support member 42. The left handlebar 70 and the right handlebar 72 can be attached indirectly to the support member 42 as shown in FIG. 2, which depicts a spacer 71 between the left handlebar 70 and the support member 42, and further depicts a spacer 73 between the right handlebar 72 and the support member 42. In other embodiments, one or both of the left handlebar 70 and the right handlebar 72 can be attached directly to the support member 42.

The support member 42 can be configured to permit the left handlebar 70 and the right handlebar 72 to be selectively moved relative to the support member 42 and the base member 40, independently of one another, to selectively adjust each of the left handlebar 70 and the right handlebar 72 in respective, generally longitudinal directions along the saddle-type vehicle 10, when the adjustable handlebar assembly 12 is pivotally coupled to the frame 14 of the saddle-type vehicle 10. This permits varying a respective distance between the seat 24 of the saddle-type vehicle 10 and each of the left handlebar 70 and the right handlebar 72.

More particularly, the support member 42 can include a first end portion 74, a second end portion 76 and an intermediate portion 78 that can connect the first end portion 74 and the second end portion 76. The left handlebar 70 can be attached to the first end portion 74 of the support member 42 and the right handlebar 72 can be attached to the second end portion 76 of the support member 42. The first end portion 74 of the support member 42 can define a slot 80 (FIGS. 3 and 4) that can permit the left handlebar 70 to be selectively adjusted forwardly and rearwardly, as indicated by arrow 82 (FIG. 2), which selectively adjusts a spacing of the left handlebar 70 forward of seat 24 of the saddle-type vehicle 10, when the adjustable handlebar assembly 12 is pivotally coupled to the frame 14 of the saddle-type vehicle 10. A top surface of the first end portion 74 of support member 42 can include a plurality of indicia, indicated generally at 81, which can facilitate determining the spacing between the left handlebar 70 and the seat 24. Alternatively, serrations can be used in lieu of indicia 81 to facilitate determining the spacing between the left handlebar 70 and the seat 24. The second end portion 76 of support member 42 can define a slot 84 that can permit the right handlebar 72 to be selectively adjusted forwardly and rearwardly, as indicated by arrow 86 (FIG. 2), which selectively adjusts a spacing of the right handlebar 72 forward of seat 24, when the adjustable handlebar assembly 12 is pivotally coupled to the frame 14 of the saddle-type vehicle 10. A top surface of the second end portion 76 of support member 42 can include a plurality of indicia, indicated generally at 85, which can facilitate determining the spacing between the right handlebar 72 and the seat 24. Alternatively, serrations can be used in lieu of indicia 85 to facilitate determining the spacing between the right handlebar 72 and the seat 24.

The adjustable handlebar assembly 12 can include a plurality of clamps 90 (FIG. 2). Each of the clamps 90 can engage the intermediate portion 78 of the support member 42 such that the support member 42 is selectively rotatable relative to the clamps 90 to selectively adjust a rake of the left handlebar 70 and a rake of the right handlebar 72. Each of the clamps 90 can include a lower portion 92 (FIGS. 3 and 4). The lower portions 92 of clamps 90 can be secured, by any suitable means, to the base member 40. Each of the clamps 90 can also include an upper portion 94 that can be removably secured to the lower portion 92 of the respective clamp 90. As shown in FIG. 3, the upper portion 94 of each clamp 90 can be secured to the lower portion 92 of the respective clamp 90, using one or more fasteners, e.g., bolts 96. Each of the bolts 96 can extend through a respective aperture 98 in the upper portion 94 of the respective clamp 90, and into a mating threaded aperture 100 formed in the lower portion 92 of the respective clamp 90.

The lower portion 92 of each clamp 90 can define an arcuate indentation 102 and the upper portion 94 of each clamp 90 can define an arcuate indentation 104. A shape of the arcuate indentation 102 can be complementary with a shape of the arcuate indentation 104 of the respective clamp 90. The shapes of the arcuate indentations 102 and 104 and the configuration of the intermediate portion 78 of the support member 42 can permit the intermediate portion 78 of the support member 42 to be selectively rotated within clamps 90, and therefore to permit the support member 42 to be selectively rotated about a longitudinal axis (not shown) of the intermediate portion 78 of the support member 42, to selectively adjust the rake of the left handlebar 70 and the rake of the right handlebar 72, which can be the same. As shown in FIG. 2, the support member 42 can be rotated in a clockwise or counter-clockwise direction relative to the clamps 90 and the base member 40 as indicated by arrow 110. When a desired position of the support member 42 is attained, bolts 96 can be tightened to prevent further rotation of the intermediate portion 78 of the support member 42 relative to clamps 90. Indicia can be provided on one or both of the clamps 90 to facilitate determining the rake of the left handlebar 70 and/or the rake of the right handlebar 72.

As subsequently described in further detail, the left handlebar 70 can be selectively pivoted about an axis 112 that extends through a portion of the left handlebar 70 and extends longitudinally through the sleeve 71, to selectively adjust a sweep of the left handlebar 70. Similarly, the right handlebar 72 can be selectively pivoted about an axis 114 that extends through a portion of the right handlebar 72 and extends longitudinally through the sleeve 73, to selectively adjust a sweep of the right handlebar 72.

The rake of the left handlebar 70 can be an angle between vertical and the axis 112, and the rake of the right handlebar 72 can be an angle between vertical and the axis 114. As shown in FIGS. 1-8, the adjustable handlebar assembly 12 can be configured such that the rake of the left handlebar 70 is the same, or at least substantially the same, as the rake of the right handlebar 72.

As shown in FIG. 4, the left handlebar 70 and the right handlebar 72 can be attached to the support member 42 using conventional fasteners, e.g., bolts 116 and nuts 118. The left handlebar 70 can be attached to the left end portion 74 of support member 42 using a first one of the bolts 116 and a first one of the nuts 118, and the right handlebar 72 can be attached to the right end portion 76 of the support member 42 using a second one of the bolts 116 and a second one of the nuts 118. This will be further appreciated with reference to FIGS. 5-8, which depict the left handlebar 70.

Figure 5:
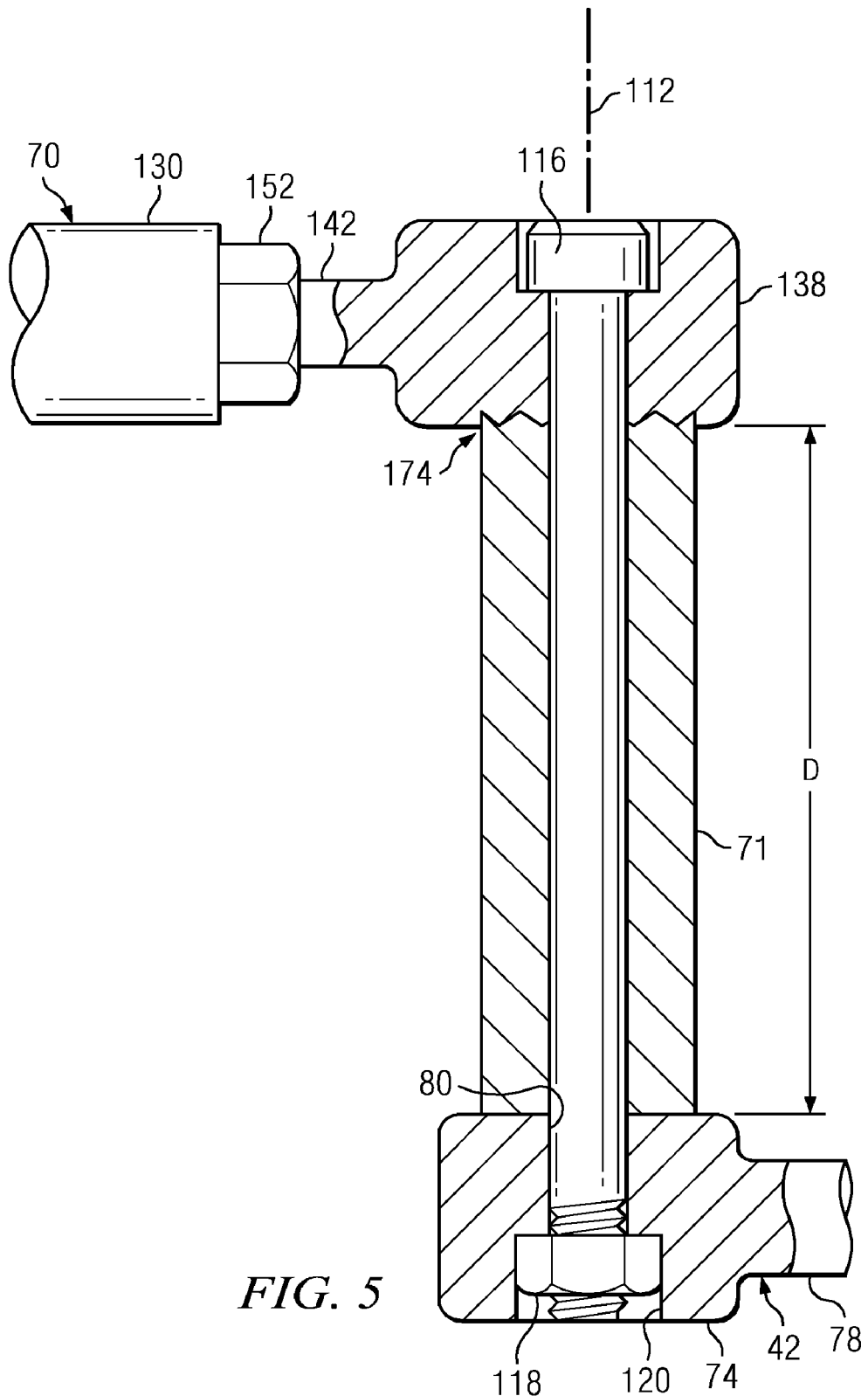
FIG. 5 is an elevation view, partially in cross-section, illustrating a portion of the adjustable handlebar assembly shown in FIGS. 1 and 2.
Figure 6:
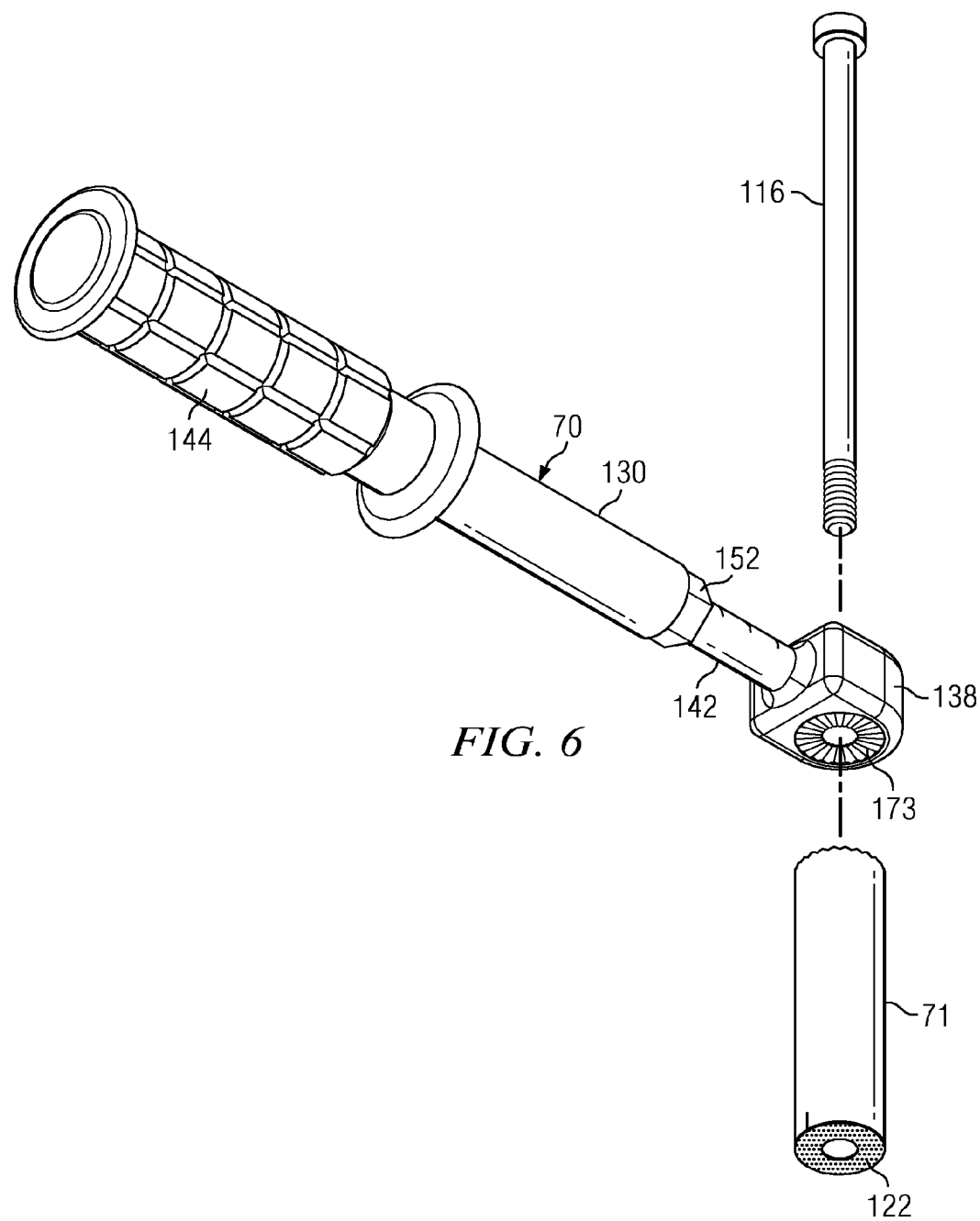
FIG. 6 is an exploded perspective view illustrating one of the handlebars of the adjustable handlebar assembly shown in FIGS. 1 and 2, and an associated spacer.
Figure 7:
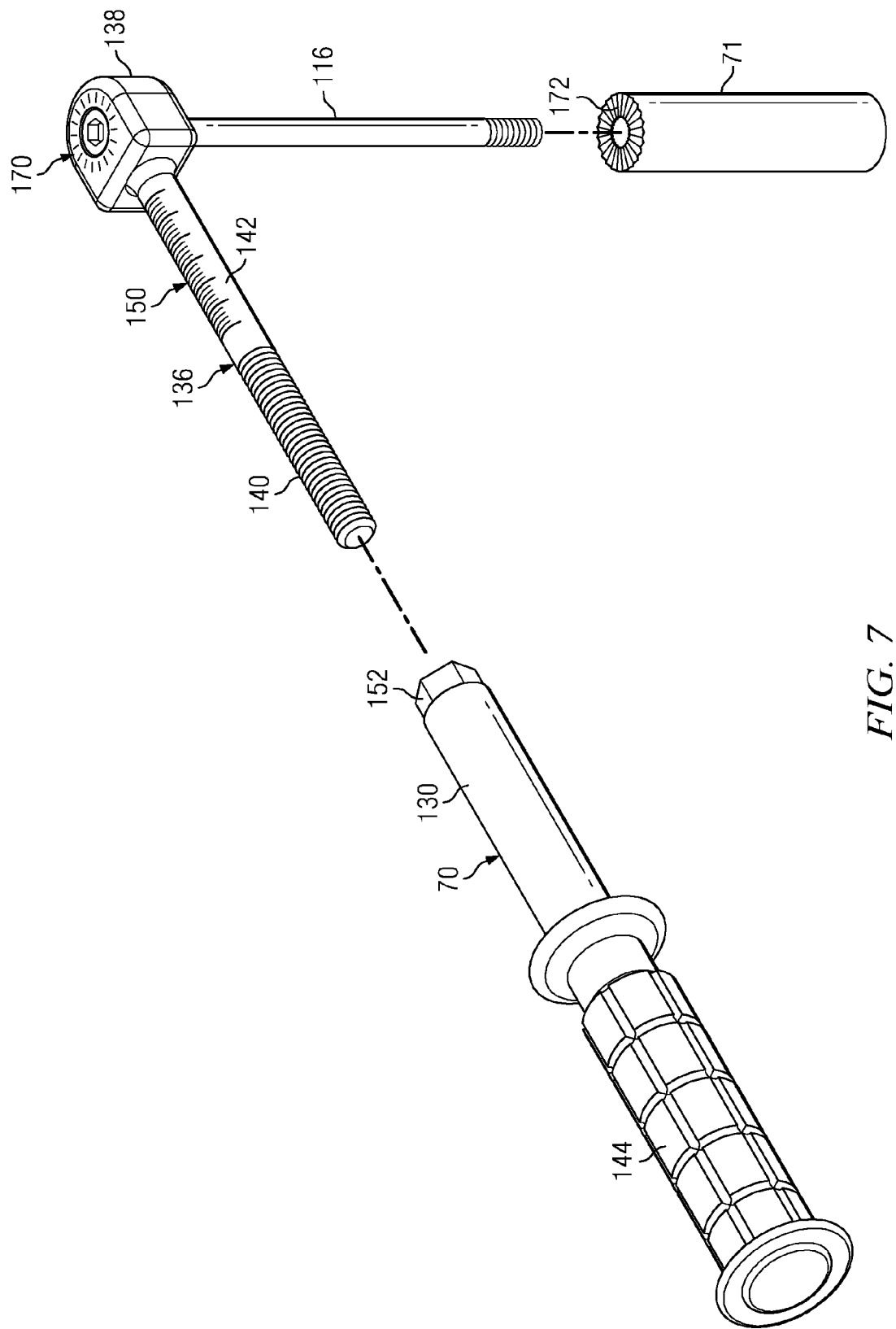
FIG. 7 is a perspective view similar to FIG. 6, illustrating a subsequent stage of assembly.

As shown in FIG. 5, one of the nuts 118 can be positioned within a groove 120 defined by the left end portion 74 of the support member 42, and the nut 118 and the groove 120 can be configured such that the respective bolt 116 can be torqued without holding nut 118. Sleeve 71 can include a plurality of external flats (not shown) such that sleeve 71 can be held with a suitable tool during the torquing process. A length of groove 120 can be selected such that the travel of bolt 116 within the full extent of slot 80 can be achieved. A bottom surface 122 of sleeve 71 can be etched, as indicated in FIG. 6, to enhance the friction between sleeve 71 and the left end portion 74 of support member 42 after the desired torque has been applied to the respective bolt 116. The right end portion 76 of the support member 42 and the sleeve 73 can be similarly configured.

A length of the spacer 71 can be selected to position the left handlebar 70 a predetermined distance "D" above the support member 42 (FIG. 5). The predetermined distance "D" can be referred to as a rise of the left handlebar 70. Similarly a length of the spacer 73 can be selected to position the right handlebar 72 a second predetermined distance (not shown) above the support member 42, which can be referred to as a rise of the right handlebar 72. Sleeves 71 and 73 can be replaceable, and a kit of sleeves of varying length can be provided such that the rise of the left handlebar 70 and the rise of the right handlebar 72 can be selectively varied.

Figure 8:
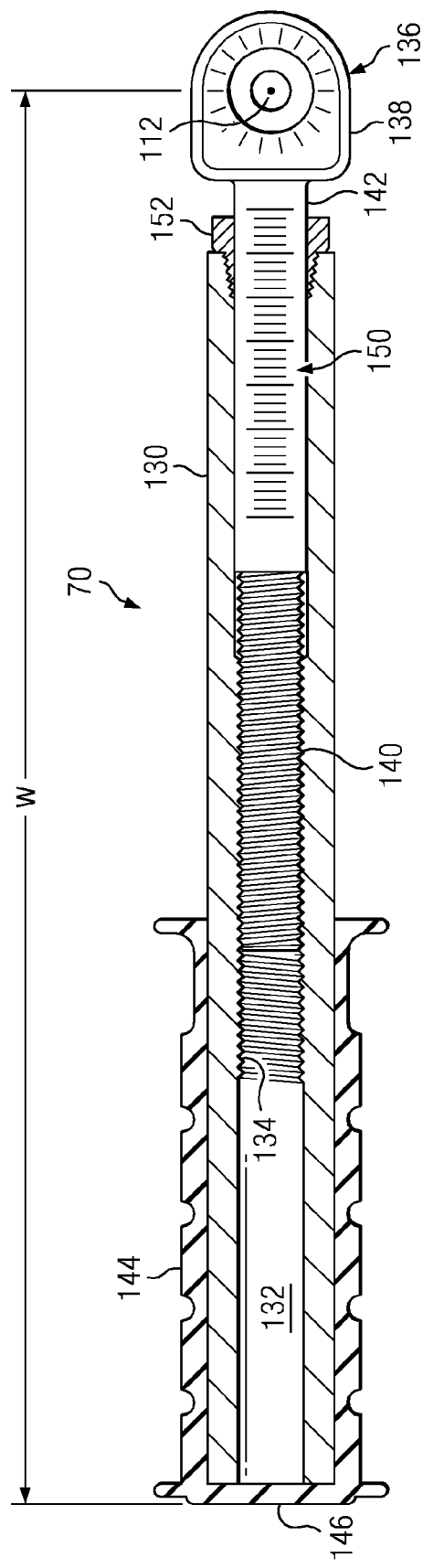
FIG. 8 illustrates the handlebar shown in FIGS. 6 and 7, partially in cross-section, in an assembled configuration.

Referring to FIG. 8, the left handlebar 70 can include a sleeve 130 that can define an internal bore 132. Sleeve 130 can include a plurality of internal, female threads 134 that can surround the internal bore 132. The left handlebar 70 can also include a bolt 136 that can include a proximal head portion 138, a threaded distal portion 140, and a shank 142 positioned between the proximal head portion 138 and the threaded distal portion 140. The threaded distal portion 140 can include a plurality of external male threads.

The left handlebar 70 can include a left handgrip 144 that can engage and surround a longitudinal portion of sleeve 130, and which can facilitate an operator's control of the adjustable handlebar assembly 12. The left handgrip 144 can include an end surface 146. The threaded distal portion 140 of bolt 136 can threadably engage the internal threads 134 of sleeve 130, by a variable amount, such that the bolt 136 and the sleeve 130 can move relative to one another, as indicated by arrow 148 (FIG. 2), to selectively vary a width "W" of the left handlebar 70. The left handlebar 70 can include a plurality of indicia, indicated generally at 150 in FIG. 8, that can be scribed, marked, or otherwise provided on shank 142 of bolt 136, which can facilitate determining the width "W" of the left handlebar 70. The width "W" can extend between the axis 112 and the end surface 146 of the handgrip 144. The left handlebar 70 can also include a tapered nut 152 that can include male threads, which can be threaded into an end of sleeve 130 having internal threads to facilitate maintaining the bolt 136 in a desired position relative to sleeve 130.

As shown in FIG. 2, the right handlebar 72 can include a sleeve 160, a bolt 162, a right handgrip 164 and a tapered nut 166, which can be configured the same as, or substantially the same as, sleeve 130, bolt 136, left handgrip 144 and tapered nut 152, respectively, of the left handlebar 70. The bolt 162 and the sleeve 160 can move relative to one another, as indicated by arrow 149 (FIG. 2), to selectively vary a width of the right handlebar 72. The bolt 162 can include scribes, markings or any other suitable indicia to facilitate determining the width of the right handlebar 72, as described previously with respect to the bolt 136.

As indicated previously, the left handlebar 70 can pivot about the axis 112 to selectively vary the sweep of the left handlebar 70, as indicated generally by arrow 168 (FIG. 2). An upper surface of the proximal head portion 138 of bolt 136 can include a plurality of circumferentially spaced and radially extending indicia, indicated generally at 170 in FIG. 2, which can facilitate determining the sweep of the left handlebar 70. An upper surface of sleeve 71 can include a plurality of circumferentially spaced and radially extending serrations 172 (FIG. 4) that can mesh with a similar plurality of serrations 173 (FIG. 6) on a lower surface of the proximal head portion 138 of bolt 136, as indicated generally at 174 (FIG. 5) to facilitate maintaining a desired sweep of the left handlebar 70 when the respective bolt 116 is tightened.

As indicated previously, the right handlebar 72 can pivot about the axis 114 to selectively vary the sweep of the right handlebar 72, as indicated by arrow 176 (FIG. 2). An upper surface of a proximal head portion 180 of the bolt 162 can include a plurality of circumferentially spaced and radially extending indicia, indicated generally at 182 in FIG. 2, which can facilitate determining the sweep of the right handlebar 72. An upper surface of sleeve 73 can include a plurality of circumferentially spaced and radially extending serrations 184 (FIG. 4) that can mesh with a similar plurality of serrations (not shown) on a lower surface of the proximal head portion 180 of bolt 162 to facilitate maintaining a desired sweep of the right handlebar 72 when the respective bolt 116 is tightened.

Use of the adjustable handlebar assembly 12 permits rake, rise, width, sweep, and longitudinal spacing forward of a vehicle seat, to be selectively adjusted independently of one another, for each of the left handlebar 70 and the right handlebar 72 of the adjustable handlebar assembly 12. This permits the realization of a wide variety of handlebar configurations, without the need for creating new prototypes to match new handlebar specifications, which can result in cost and time savings such as when designing a new vehicle layout.

A respective longitudinal spacing of each of the left handlebar 70 and the right handlebar 72 relative to a seat of a vehicle, such as seat 24 of the saddle-type vehicle 10, can be selectively varied by loosening bolts 116 such that bolts 116, as well as the left handlebar 70 and the right handlebar 72, can be moved in generally forward and rearward directions along a vehicle, such as vehicle 10 shown in FIG. 1. The rake of the left handlebar 70 and the rake of the right handlebar 72 can be adjusted by loosening bolts 96 that are threaded into clamps 90, such that the support member 42, sleeves 71 and 73, and the left handlebar 70 and the right handlebar 72 can be rotated relative to clamps 90 and base member 40. The rise of the left handlebar 70 and the right handlebar 72 can be selectively adjusted by replacing sleeves 71 and 73, respectively, with sleeves having different lengths.

The sweep of the left handlebar 70 can be selectively adjusted by loosening the respective one of bolts 116 and pivoting the left handlebar 70 about the axis 112. The sweep of the right handlebar 72 can be selectively adjusted by loosening the respective one of the bolts 116 and pivoting the right handlebar 72 about the axis 114. The width of the left handlebar 70 can be selectively adjusted by varying the length of the threaded engagement of the bolt 136 with the sleeve 130. The width of the right handlebar 72 can be selectively adjusted by varying the length of the threaded engagement of the bolt 162 with the sleeve 160.

While various embodiments of an adjustable handlebar assembly, a saddle-type vehicle and a motorcycle have been illustrated by the foregoing description and have been described in considerable detail, it is not intended to restrict or in any way limit the scope of the appended claims to such detail. Additional modifications will be readily apparent to those skilled in the art.

What is claimed is:

1. An adjustable handlebar assembly for a saddle-type vehicle, the adjustable handlebar assembly comprising:
   a base member;
   a support member rotatably coupled to the base member;
   a left handlebar attached to the support member; and
   a right handlebar attached to the support member; wherein:
   the support member comprises first and second slots to permit the left handlebar and the right handlebar, respectively, to be selectively moved in generally forward and rearward directions along a vehicle relative to the support member and the base member, independently of one another, when the adjustable handlebar assembly is pivotally coupled to a frame of a saddle-type vehicle.

2. An adjustable handlebar assembly for a saddle-type vehicle, the adjustable handlebar assembly comprising:
   a base member;
   a support member rotatably coupled to the base member;
   a left handlebar attached to the support member; and
   a right handlebar attached to the support member; wherein:
   the support member is configured to permit the left handlebar and the right handlebar to be selectively moved relative to the support member and the base member, independently of one another, to selectively adjust each of the left handlebar and the right handlebar in respective, generally longitudinal directions along a saddle-type vehicle, when the adjustable handlebar assembly is pivotally coupled to a frame of the saddle-type vehicle; and
   the support member comprises a first end portion, a second end portion and an intermediate portion connecting the first and second end portions;
   the left handlebar is attached to the first end portion of the support member, the first end portion defining a first slot that permits the left handlebar to be selectively adjusted forwardly and rearwardly when the adjustable handlebar assembly is pivotally coupled to a frame of the saddle-type vehicle; and
   the right handlebar is attached to the second end portion of the support member, the second end portion defining a second slot that permits the right handlebar to be selectively adjusted forwardly and rearwardly when the adjustable handlebar assembly is pivotally coupled to the frame of a saddle-type vehicle.

3. The adjustable handlebar assembly of claim 2, further comprising:
   a plurality of clamps supported by the base member; wherein:
   each of the clamps engages the intermediate portion of the support member such that the support member is selectively rotatable relative to the clamps to selectively adjust a first rake of the left handlebar and a second rake of the right handlebar.

4. The adjustable handlebar assembly of claim 3, wherein:
   each of the clamps comprises a lower portion secured to the base member and an upper portion securable to the lower portion;
   the lower portion of each of the clamps defines a first arcuate indentation having a first shape;
   the upper portion of each of the clamps defines a second arcuate indentation having a second shape;
   the first shape and the second shape of each respective clamp complement one another; and
   a configuration of the intermediate portion of the support member, the first shape of the first arcuate indentation of the lower portion of each of the clamps, and the second shape of the second arcuate indentation of the upper portion of each of the clamps permit the intermediate portion of the support member to be selectively rotated within the clamps such that the support member is selectively rotatable to selectively adjust the first rake of the left handlebar and the second rake of the right handlebar.

5. The adjustable handlebar assembly of claim 2, further comprising:
   a first spacer positioned between the first end portion of the support member and the left handlebar to position the left handlebar a first predetermined distance from the support member; and
   a second spacer positioned between the second end portion of the support member and the right handlebar to position the right handlebar a second predetermined distance from the support member.

6. The adjustable handlebar assembly of claim 5, wherein:
   each of the first spacer and the second spacer is replaceable to permit the first predetermined distance and the second predetermined distance, respectively, to be selectively varied.

7. The adjustable handlebar assembly of claim 2, further comprising:
   a first male fastener having a first longitudinal axis;
   a second male fastener having a second longitudinal axis;
   a first female fastener; and
   a second female fastener; wherein
   the left handlebar is attached to the first end portion of the support member with the first male fastener and the first female fastener, the left handlebar being selectively pivotable about the first longitudinal axis of the first male fastener to selectively adjust a first sweep of the left handlebar; and
   the right handlebar is attached to the second end portion of the support member with the second male fastener and the second female fastener, the right handlebar being selectively pivotable about the second longitudinal axis of the second male fastener to selectively adjust a second sweep of the right handlebar.

8. The adjustable handlebar assembly of claim 2, wherein:
   the left handlebar comprises a first sleeve defining a first internal bore, the first sleeve comprising a first plurality of internal threads surrounding the first internal bore;
   the right handlebar comprises a second sleeve defining a second internal bore, the second sleeve comprising a second plurality of internal threads surrounding the second internal bore;
   the left handlebar further comprises a first bolt and the right handlebar further comprises a second bolt;
   each of the first bolt and the second bolt comprises a proximal head portion, a threaded distal portion and a shank positioned between the proximal head portion and the threaded distal portion of a respective one of the first bolt and the second bolt;
   the threaded distal portion of the first bolt threadably engages the first plurality of internal threads of the first sleeve of the left handlebar, by a variable amount, to permit a first width of the left handlebar to be selectively varied; and the threaded distal portion of the second bolt threadably engages the second plurality of internal threads of the second sleeve of the right handlebar, by a variable amount, to permit a second width of the right handlebar to be selectively varied.

9. A saddle-type vehicle comprising:
a frame; and
an adjustable handlebar assembly pivotally coupled to the frame, the adjustable handlebar assembly comprising:
a base member;
a support member rotatably coupled to the base member;
a left handlebar attached to the support member; and
a right handlebar attached to the support member; wherein:
the support member comprises first and second slots to permit the left handlebar and the right handlebar, respectively, to be selectively moved in generally forward and rearward directions along the saddle-type vehicle relative to the support member and the base member, independently of one another.

10. A saddle-type vehicle comprising:
a frame; and
an adjustable handlebar assembly pivotally coupled to the frame, the adjustable handlebar assembly comprising:
a base member;
a support member rotatably coupled to the base member,
a left handlebar attached to the support member; and
a right handlebar attached to the support member; wherein:
the support member is configured to permit the left handlebar and the right handlebar to be selectively moved relative to the support member and the base member, independently of one another, to selectively adjust each of the left handlebar and the right handlebar in respective, generally longitudinal directions along the saddle-type vehicle;
the support member comprises a first end portion, a second end portion and an intermediate portion connecting the first and second end portions;
the left handlebar is attached to the first end portion of the support member, the first end portion defining a first slot that permits the left handlebar to be selectively adjusted forwardly and rearwardly; and
the right handlebar is attached to the second end portion of the support member, the second end portion defining a second slot that permits the right handlebar to be selectively adjusted forwardly and rearwardly.

11. The saddle-type vehicle of claim 10, wherein the adjustable-handlebar assembly further comprises:
a plurality of clamps supported by the base member; wherein
each of the clamps engages the intermediate portion of the support member such that the support member is selectively rotatable relative to the clamps to selectively adjust a first rake of the left handlebar and a second rake of the right handlebar.

12. The saddle-type vehicle of claim 11, wherein:
each of the clamps comprises a lower portion secured to the base member and an upper portion securable to the lower portion;
the lower portion of each of the clamps defines a first arcuate indentation having a first shape;
the upper portion of each of the clamps defines a second arcuate indentation having a second shape;
the first shape and the second shape of each respective clamp complement one another; and
a configuration of the intermediate portion of the support member, the first shape of the first arcuate indentation of the lower portion of each of the clamps, and the second shape of the second arcuate indentation of the upper portion of each of the clamps permit the intermediate portion of the support member to be selectively rotated within the clamps such that the support member is selectively rotatable to selectively adjust the first rake of the left handlebar and the second rake of the right handlebar.

13. The saddle-type vehicle of claim 10, wherein the adjustable handlebar assembly further comprises:
a first spacer positioned between the first end portion of the support member and the left handlebar to position the left handlebar a first predetermined distance from the support member; and
a second spacer positioned between the second end portion of the support member and the right handlebar to position the right handlebar a second predetermined distance from the support member.

14. The saddle-type vehicle of claim 13, wherein:
each of the first spacer and the second spacer is replaceable to permit the first predetermined distance and the second predetermined distance, respectively, to be selectively varied.

15. The saddle-type vehicle of claim 10, wherein:
the left handlebar comprises a first sleeve defining a first internal bore, the first sleeve comprising a first plurality of internal threads surrounding the first internal bore;
the right handlebar comprises a second sleeve defining a second internal bore, the second sleeve comprising a second plurality of internal threads surrounding the second internal bore;
the left handlebar further comprises a first bolt and the right handlebar further comprises a second bolt;
each of the first bolt and the second bolt comprises a proximal head portion, a threaded distal portion and a shank positioned between the proximal head portion and the threaded distal portion of a respective one of the first bolt and the second bolt;
the threaded distal portion of the first bolt threadably engages the first plurality of internal threads of the first sleeve of the left handlebar, by a variable amount, to permit a first width of the left handlebar to be selectively varied; and
the threaded distal portion of the second bolt threadably engages the second plurality of internal threads of the second sleeve of the right handlebar, by a variable amount, to permit a second width of the right handlebar to be selectively varied.

16. The saddle-type vehicle of claim 10, wherein the adjustable handlebar assembly further comprises:
a first male fastener having a first longitudinal axis;
a second male fastener having a second longitudinal axis;
a first female fastener; and
a second female fastener; wherein
the left handlebar is attached to the first end portion of the support member with the first male fastener and the first female fastener, the left handlebar being selectively pivotable about the first longitudinal axis of the first male fastener to selectively adjust a first sweep of the left handlebar; and
the right handlebar is attached to the second end portion of the support member with the second male fastener and the second female fastener, the right handlebar being selectively pivotable about the second longitudinal axis of the second male fastener to selectively adjust a second sweep of the right handlebar.

17. The saddle-type vehicle of claim 10, wherein the saddle-type vehicle is a motorcycle and further comprises:
a front wheel;
a rear wheel;
a fork; and
a seat supported by the frame and configured to support an operator of the motorcycle; wherein
the fork rotatably supports the front wheel and is attached to the base member of the adjustable handlebar assembly; and
the rear wheel is rotatably coupled to the frame.

18. A motorcycle comprising:
a frame;
a seat supported by the frame;
a front wheel;
a rear wheel rotatably coupled to the frame;
a fork, the fork rotatably supporting the front wheel; and
an adjustable handlebar assembly comprising a left handlebar and a right handlebar, the adjustable handlebar assembly being attached to the fork and pivotally coupled to the frame; wherein
the adjustable handlebar assembly is operable for steering the front wheel; and
the adjustable handlebar assembly is adjustable to selectively adjust rake, rise, width, sweep, and longitudinal spacing forward of the seat, for each of the left handlebar and the right handlebar.

19. The motorcycle of claim 18, wherein:
the adjustable handlebar assembly further comprises a support member, a first spacer and a second spacer;
the support member comprises a first end portion, a second end portion and an intermediate portion connecting the first and second end portions;
the left handlebar is attached to the first end portion of the support member, the first end portion defining a first slot that permits the left handlebar to be selectively adjusted forwardly and rearwardly;
the right handlebar is attached to the second end portion of the support member, the second end portion defining a second slot that permits the right handlebar to be selectively adjusted forwardly and rearwardly;
the first spacer is positioned between the first end portion of the support member and the left handlebar to position the left handlebar a first predetermined distance from the support member;
the second spacer is positioned between the second end portion of the support member and the right handlebar to position the right handlebar a second predetermined distance from the support member;
each of the first spacer and the second spacer is replaceable to permit the first predetermined distance and the second predetermined distance, respectively, to be selectively varied;
the left handlebar comprises a first sleeve defining a first internal bore, the first sleeve comprising a first plurality of internal threads surrounding the first internal bore;
the right handlebar comprises a second sleeve defining a second internal bore, the second sleeve comprising a second plurality of internal threads surrounding the second internal bore;
the left handlebar further comprises a first bolt and the right handlebar further comprises a second bolt;
each of the first bolt and the second bolt comprises a proximal head portion, a threaded distal portion and a shank positioned between the proximal head portion and the threaded distal portion of a respective one of the first bolt and the second bolt;
the threaded distal portion of the first bolt threadably engages the first plurality of internal threads of the first sleeve of the left handlebar, by a variable amount, to permit a first width of the left handlebar to be selectively varied; and
the threaded distal portion of the second bolt threadably engages the second plurality of internal threads of the second sleeve of the right handlebar, by a variable amount, to permit a second width of the right handlebar to be selectively varied.

20. The motorcycle of claim 19, wherein the adjustable handlebar assembly further comprises:
a plurality of clamps supported by the base member;
a first male fastener having a first longitudinal axis;
a second male fastener having a second longitudinal axis;
a first female fastener; and
a second female fastener; wherein:
each of the clamps engages the intermediate portion of the support member such that the support member is selectively rotatable relative to the clamps to selectively adjust a first rake of the left handlebar and a second rake of the right handlebar;
the left handlebar is attached to the first end portion of the support member with the first male fastener and the first female fastener, the left handlebar being selectively pivotable about the first longitudinal axis of the first male fastener to selectively adjust a first sweep of the left handlebar; and
the right handlebar is attached to the second end portion of the support member with the second male fastener and the second female fastener, the right handlebar being selectively pivotable about the second longitudinal axis of the second male fastener to selectively adjust a second sweep of the right handlebar.

21. A method for designing an adjustable handlebar assembly for a saddle-type vehicle, the method comprising:
pivotally coupling an adjustable handlebar assembly to a frame of a saddle-type vehicle, the adjustable handlebar assembly comprising a base member pivotally coupled to the frame, a support member rotatably coupled to the base member, a left handlebar attached to the support member and a right handlebar attached to the support member; and
providing first and second slots in the support member to permit the left handlebar and the right handlebar to be selectively moved in generally forward and rearward directions along the saddle-type vehicle relative to the support member and the base member, independently of one another.

22. A method for designing an adjustable handlebar assembly for a saddle-type vehicle, the method comprising:
pivotally coupling an adjustable handlebar assembly to a frame of a saddle-type vehicle, the adjustable handlebar assembly comprising a base member pivotally coupled to the frame, a support member rotatably coupled to the base member, a left handlebar attached to the support member and a right handlebar attached to the support member; and
configuring the support member to permit the left handlebar and the right handlebar to be selectively moved relative to the support member and the base member, independently of one another, to selectively adjust each of the left handlebar and the right handlebar in respective, generally longitudinal directions along the saddle-type vehicle;

adjusting a first rake of the left handlebar and a second rake of the right handlebar by rotating the support member relative to the base member;

attaching the left handlebar to the support member using a first male fastener having a first longitudinal axis and a first female fastener;

attaching the right handlebar to the support member using a second male fastener having a second longitudinal axis and a second female fastener;

adjusting a first sweep of the left handlebar by pivoting the left handlebar about the first longitudinal axis of the first male fastener;

adjusting a second sweep of the right handlebar by pivoting the right handlebar about the second longitudinal axis of the second male fastener;

adjusting a first width of the left handlebar by varying a threaded engagement of a first bolt of the left handlebar with a first sleeve of the left handlebar;

adjusting a second width of the right handlebar by varying a threaded engagement of a second bolt of the right handlebar with a second sleeve of the right handlebar;

positioning a first spacer, having a first predetermined length, between the support member and the left handlebar to achieve a desired first rake of the left handlebar; and positioning a second spacer, having a second predetermined length, between the support member and the right handlebar to achieve a desired second rake of the right handlebar.

* * * * *

UNITED STATES PATENT AND TRADEMARK OFFICE
CERTIFICATE OF CORRECTION

| | |
|---|---|
| PATENT NO. | : 8,029,011 B2 |
| APPLICATION NO. | : 12/612808 |
| DATED | : October 4, 2011 |
| INVENTOR(S) | : Darin D. King et al. |

Page 1 of 1

It is certified that error appears in the above-identified patent and that said Letters Patent is hereby corrected as shown below:

Claim 10, column 9, line 27, change "member," to -- member; --.

Signed and Sealed this
Twentieth Day of March, 2012

David J. Kappos
*Director of the United States Patent and Trademark Office*